(12) United States Patent
Stratton et al.

(10) Patent No.: US 9,599,813 B1
(45) Date of Patent: Mar. 21, 2017

(54) WAVEGUIDE COMBINER SYSTEM AND METHOD WITH LESS SUSCEPTIBILITY TO GLARE

(71) Applicants: Eric P. Stratton, Portland, OR (US); Chris M. Buchholz, West Linn, OR (US); Christopher A. Keith, Wilsonville, OR (US); Kurt A. Stahl, Portland, OR (US); Brandon E. Wilson, Portland, OR (US)

(72) Inventors: Eric P. Stratton, Portland, OR (US); Chris M. Buchholz, West Linn, OR (US); Christopher A. Keith, Wilsonville, OR (US); Kurt A. Stahl, Portland, OR (US); Brandon E. Wilson, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/892,057

(22) Filed: May 10, 2013

(51) Int. Cl.
*G02B 27/01* (2006.01)
*G02B 5/18* (2006.01)

(52) U.S. Cl.
CPC .......... *G02B 27/0101* (2013.01); *G02B 5/18* (2013.01); *G02B 2027/0118* (2013.01)

(58) Field of Classification Search
CPC ............ G02B 27/0101; G02B 27/0103; G02B 27/0109; G02B 27/0118; G02B 2027/0118; G02B 2027/012; G02B 2027/0121; G02B 2027/0141; G02B 2027/0149; G02B 2027/015; G02B 2027/0161; G02B 2027/0163; G02B 2027/0172; G02B 2027/0103; G02B 2027/01; G02B 2005/1804; G02B 5/1847; G02B 5/181

USPC ......... 359/566, 569, 572, 575, 576, 13, 630, 359/632, 633; 349/7, 8, 9; 348/115
See application file for complete search history.

(56) References Cited

U.S. PATENT DOCUMENTS

| | | |
|---|---|---|
| 2,141,884 A | 12/1938 | Sonnefeld |
| 3,620,601 A | 11/1971 | Waghorn |
| 3,851,303 A | 11/1974 | Muller |
| 3,885,095 A | 5/1975 | Wolfson et al. |

(Continued)

FOREIGN PATENT DOCUMENTS

| | | |
|---|---|---|
| CN | 101881936 A | 11/2010 |
| DE | 1020060 03 785 | 7/2007 |

(Continued)

OTHER PUBLICATIONS

Non-Final Office Action on U.S. Appl. No. 13/250,858 Dated Sep. 15, 2014, 16 pages.

(Continued)

*Primary Examiner* — Thomas K Pham
*Assistant Examiner* — Marin Pichler
(74) *Attorney, Agent, or Firm* — Donna P. Suchy; Daniel M. Barbieri

(57) ABSTRACT

A system and method for a head up display (HUD) can mitigate glare. The head up display can include a waveguide combiner including an input grating and an output grating and a glare mitigator disposed to prevent glare through the output grating from reaching an eye box. The glare mitigator can be a shade, a diffuser, a dimming element, or other device for mitigating glare. The glare mitigator can be an active or passive glare mitigator.

14 Claims, 4 Drawing Sheets

(56) References Cited

U.S. PATENT DOCUMENTS

| | | | |
|---|---|---|---|
| 3,940,204 A | 2/1976 | Withrington | |
| 4,082,432 A | 4/1978 | Kirschner | |
| 4,099,841 A | 7/1978 | Ellis | |
| 4,178,074 A | 12/1979 | Heller | |
| 4,218,111 A | 8/1980 | Withrington et al. | |
| 4,232,943 A | 11/1980 | Rogers | |
| 4,309,070 A | 1/1982 | St. Leger Searle | |
| 4,647,967 A | 3/1987 | Kirschner et al. | |
| 4,711,512 A | 12/1987 | Upatnieks | |
| 4,714,320 A | 12/1987 | Banbury | |
| 4,743,083 A | 5/1988 | Schimpe | |
| 4,749,256 A | 6/1988 | Bell et al. | |
| 4,775,218 A | 10/1988 | Wood et al. | |
| 4,854,688 A | 8/1989 | Hayford et al. | |
| 4,928,301 A | 5/1990 | Smoot | |
| 4,946,245 A | 8/1990 | Chamberlin et al. | |
| 5,007,711 A * | 4/1991 | Wood et al. | 359/13 |
| 5,035,734 A | 7/1991 | Honkanen et al. | |
| 5,076,664 A | 12/1991 | Migozzi | |
| 5,079,416 A | 1/1992 | Filipovich | |
| 5,117,285 A | 5/1992 | Nelson et al. | |
| 5,124,821 A | 6/1992 | Antier et al. | |
| 5,148,302 A | 9/1992 | Nagano et al. | |
| 5,151,958 A | 9/1992 | Honkanen | |
| 5,153,751 A | 10/1992 | Ishikawa et al. | |
| 5,159,445 A | 10/1992 | Gitlin et al. | |
| 5,160,523 A | 11/1992 | Honkanen et al. | |
| 5,183,545 A | 2/1993 | Branca et al. | |
| 5,187,597 A | 2/1993 | Kato et al. | |
| 5,210,624 A | 5/1993 | Matsumoto et al. | |
| 5,218,360 A | 6/1993 | Goetz et al. | |
| 5,243,413 A | 9/1993 | Gitlin et al. | |
| 5,289,315 A | 2/1994 | Makita et al. | |
| 5,295,208 A | 3/1994 | Caulfield et al. | |
| 5,303,085 A | 4/1994 | Rallison | |
| 5,317,405 A | 5/1994 | Kuriki et al. | |
| 5,341,230 A | 8/1994 | Smith | |
| 5,351,151 A | 9/1994 | Levy | |
| 5,359,362 A | 10/1994 | Lewis et al. | |
| 5,363,220 A | 11/1994 | Kuwayama et al. | |
| 5,369,511 A | 11/1994 | Amos | |
| 5,400,069 A | 3/1995 | Braun et al. | |
| 5,408,346 A | 4/1995 | Trissel et al. | |
| 5,418,584 A | 5/1995 | Larson | |
| 5,438,357 A | 8/1995 | McNelley | |
| 5,455,693 A | 10/1995 | Wreede et al. | |
| 5,471,326 A | 11/1995 | Hall et al. | |
| 5,473,222 A | 12/1995 | Thoeny et al. | |
| 5,496,621 A | 3/1996 | Makita et al. | |
| 5,500,671 A | 3/1996 | Andersson et al. | |
| 5,510,913 A | 4/1996 | Hashimoto et al. | |
| 5,515,184 A | 5/1996 | Caulfield et al. | |
| 5,524,272 A | 6/1996 | Podowski et al. | |
| 5,532,736 A | 7/1996 | Kuriki et al. | |
| 5,537,232 A | 7/1996 | Biles | |
| 5,572,248 A | 11/1996 | Allen et al. | |
| 5,579,026 A | 11/1996 | Tabata | |
| 5,604,611 A | 2/1997 | Saburi et al. | |
| 5,606,433 A | 2/1997 | Yin et al. | |
| 5,612,733 A | 3/1997 | Flohr | |
| 5,612,734 A | 3/1997 | Nelson et al. | |
| 5,619,254 A | 4/1997 | McNelley | |
| 5,629,259 A | 5/1997 | Akada et al. | |
| 5,631,107 A | 5/1997 | Tarumi et al. | |
| 5,633,100 A | 5/1997 | Mickish et al. | |
| 5,646,785 A | 7/1997 | Gilboa et al. | |
| 5,648,857 A | 7/1997 | Ando et al. | |
| 5,661,577 A | 8/1997 | Jenkins et al. | |
| 5,661,603 A | 8/1997 | Hanano et al. | |
| 5,665,494 A | 9/1997 | Kawabata et al. | |
| 5,668,907 A | 9/1997 | Veligdan | |
| 5,682,255 A | 10/1997 | Friesem et al. | |
| 5,694,230 A | 12/1997 | Welch | |
| 5,701,132 A | 12/1997 | Kollin et al. | |
| 5,706,108 A | 1/1998 | Ando et al. | |
| 5,707,925 A | 1/1998 | Akada et al. | |
| 5,724,189 A | 3/1998 | Ferrante | |
| 5,726,782 A | 3/1998 | Kato et al. | |
| 5,727,098 A | 3/1998 | Jacobson | |
| 5,729,242 A | 3/1998 | Margerum et al. | |
| 5,731,060 A | 3/1998 | Hirukawa et al. | |
| 5,731,853 A | 3/1998 | Taketomi et al. | |
| 5,742,262 A | 4/1998 | Tabata et al. | |
| 5,751,452 A | 5/1998 | Tanaka et al. | |
| 5,760,931 A | 6/1998 | Saburi et al. | |
| 5,764,414 A | 6/1998 | King et al. | |
| 5,790,288 A | 8/1998 | Jager et al. | |
| 5,812,608 A | 9/1998 | Valimaki et al. | |
| 5,822,127 A | 10/1998 | Chen et al. | |
| 5,841,507 A | 11/1998 | Barnes | |
| 5,856,842 A | 1/1999 | Tedesco | |
| 5,868,951 A | 2/1999 | Schuck et al. | |
| 5,892,598 A | 4/1999 | Asakawa et al. | |
| 5,898,511 A | 4/1999 | Mizutani et al. | |
| 5,903,395 A | 5/1999 | Rallison et al. | |
| 5,907,416 A | 5/1999 | Hegg et al. | |
| 5,907,436 A | 5/1999 | Perry et al. | |
| 5,917,459 A | 6/1999 | Son et al. | |
| 5,926,147 A | 7/1999 | Sehm et al. | |
| 5,929,946 A | 7/1999 | Sharp et al. | |
| 5,937,115 A | 8/1999 | Domash | |
| 5,942,157 A | 8/1999 | Sutherland et al. | |
| 5,945,893 A | 8/1999 | Plessky et al. | |
| 5,949,302 A | 9/1999 | Sarkka | |
| 5,966,223 A | 10/1999 | Friesem et al. | |
| 5,985,422 A | 11/1999 | Krauter | |
| 5,991,087 A | 11/1999 | Rallison | |
| 5,999,314 A | 12/1999 | Asakura et al. | |
| 6,042,947 A | 3/2000 | Asakura et al. | |
| 6,043,585 A | 3/2000 | Plessky et al. | |
| 6,075,626 A | 6/2000 | Mizutani et al. | |
| 6,078,427 A | 6/2000 | Fontaine et al. | |
| 6,115,152 A | 9/2000 | Popovich et al. | |
| 6,127,066 A | 10/2000 | Ueda et al. | |
| 6,137,630 A | 10/2000 | Tsou et al. | |
| 6,169,613 B1 | 1/2001 | Amitai et al. | |
| 6,176,837 B1 | 1/2001 | Foxlin | |
| 6,195,206 B1 | 2/2001 | Yona et al. | |
| 6,222,675 B1 | 4/2001 | Mall et al. | |
| 6,222,971 B1 | 4/2001 | Veligdan et al. | |
| 6,249,386 B1 | 6/2001 | Yona et al. | |
| 6,259,423 B1 | 7/2001 | Tokito et al. | |
| 6,259,559 B1 | 7/2001 | Kobayashi et al. | |
| 6,285,813 B1 | 9/2001 | Schultz et al. | |
| 6,317,083 B1 | 11/2001 | Johnson et al. | |
| 6,317,227 B1 | 11/2001 | Mizutani et al. | |
| 6,321,069 B1 | 11/2001 | Piirainen | |
| 6,327,089 B1 | 12/2001 | Hosaki et al. | |
| 6,333,819 B1 | 12/2001 | Svedenkrans | |
| 6,340,540 B1 | 1/2002 | Ueda et al. | |
| 6,351,333 B2 | 2/2002 | Araki et al. | |
| 6,356,172 B1 | 3/2002 | Koivisto et al. | |
| 6,359,730 B2 | 3/2002 | Tervonen | |
| 6,359,737 B1 | 3/2002 | Stringfellow | |
| 6,366,378 B1 | 4/2002 | Tervonen et al. | |
| 6,392,812 B1 | 5/2002 | Howard | |
| 6,409,687 B1 | 6/2002 | Foxlin | |
| 6,470,132 B1 | 10/2002 | Nousiainen et al. | |
| 6,486,997 B1 | 11/2002 | Bruzzone et al. | |
| 6,504,518 B1 | 1/2003 | Kuwayama et al. | |
| 6,524,771 B2 | 2/2003 | Maeda et al. | |
| 6,545,778 B2 | 4/2003 | Ono et al. | |
| 6,550,949 B1 | 4/2003 | Bauer et al. | |
| 6,557,413 B2 | 5/2003 | Nieminen et al. | |
| 6,563,648 B2 | 5/2003 | Gleckman et al. | |
| 6,580,529 B1 | 6/2003 | Amitai et al. | |
| 6,583,873 B1 | 6/2003 | Goncharov et al. | |
| 6,587,619 B1 | 7/2003 | Kinoshita | |
| 6,598,987 B1 | 7/2003 | Parikka | |
| 6,608,720 B1 | 8/2003 | Freeman | |
| 6,611,253 B1 | 8/2003 | Cohen | |
| 6,646,810 B2 | 11/2003 | Harter et al. | |
| 6,661,578 B2 | 12/2003 | Hedrick | |
| 6,674,578 B2 | 1/2004 | Sugiyama et al. | |

(56) References Cited

U.S. PATENT DOCUMENTS

| | | |
|---|---|---|
| 6,686,815 B1 | 2/2004 | Mirshekarl-Syahkal et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,750,995 B2 | 6/2004 | Dickson |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 | 3/2005 | Schehrer et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 * | 10/2006 | Breed ............................ 345/158 |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,656,585 B1 | 2/2010 | Powell et al. |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |

(56) References Cited

U.S. PATENT DOCUMENTS

| | | |
|---|---|---|
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | Dejean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,254,031 B2 | 8/2012 | Levola |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,335,040 B2 | 12/2012 | Mukawa et al. |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,472,119 B1 | 6/2013 | Kelly |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,547,638 B2 | 10/2013 | Levola |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,634,139 B1 | 1/2014 | Brown et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,749,886 B2 | 6/2014 | Gupta |
| 8,749,890 B1 | 6/2014 | Wood et al. |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,913,324 B2 | 12/2014 | Schrader |
| 8,938,141 B2 | 1/2015 | Magnusson |
| 2002/0012064 A1 | 1/2002 | Yamaguchi |
| 2002/0021461 A1* | 2/2002 | Ono et al. ............... 359/13 |
| 2002/0131175 A1 | 9/2002 | Yagi et al. |
| 2003/0030912 A1 | 2/2003 | Gleckman et al. |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutehrland et al. |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2006/0291021 A1 | 12/2006 | Mukawa |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1* | 4/2009 | Amitai ............... 359/633 |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |

(56) References Cited

U.S. PATENT DOCUMENTS

| | | |
|---|---|---|
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0296163 A1 | 11/2010 | Saarikko |
| 2010/0315719 A1 | 12/2010 | Saarikko et al. |
| 2010/0321781 A1 | 12/2010 | Levola et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0235179 A1 | 9/2011 | Simmonds |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0310356 A1 | 12/2011 | Vallius |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0224062 A1 | 9/2012 | Lacoste et al. |
| 2012/0235884 A1 | 9/2012 | Miller et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0300311 A1 | 11/2012 | Simmonds et al. |
| 2012/0320460 A1 | 12/2012 | Levola |
| 2013/0069850 A1 | 3/2013 | Mukawa et al. |
| 2013/0093893 A1 | 4/2013 | Schofield et al. |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0200710 A1 | 8/2013 | Robbins |
| 2013/0249895 A1 | 9/2013 | Westerinen et al. |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2015/0010265 A1 | 1/2015 | Popovich et al. |
| 2015/0289762 A1 | 10/2015 | Popovich et al. |

FOREIGN PATENT DOCUMENTS

| | | |
|---|---|---|
| EP | 0 822 441 | 2/1998 |
| EP | 2 110 701 | 10/2009 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2004-157245 | 6/2004 |
| WO | WO-99/52002 | 10/1999 |
| WO | WO-03/081320 A1 | 10/2003 |
| WO | WO-2006/002870 | 1/2006 |
| WO | WO-2007/130130 A2 | 11/2007 |
| WO | WO-2007/130130 A3 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2010/125337 A3 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |

OTHER PUBLICATIONS

Notice of Allowance on U.S. Appl. No. 13/250,970 dated Sep. 16, 2014, 7 pages.

Notice of Allowance on U.S. Appl. No. 13/251,087 Dated Jul. 17, 2014, 8 pages.

Ayras et al., Exit Pupil Expander with a Large Field of View Based on Diffractive Optics, Journal of the SID, 2009, 6 pages.

Notice of Allowance for U.S. Appl. No. 12/700,557, mail date Oct. 22, 2013, 9 pages.

Office Action for U.S. Appl. No. 12/700,557, mail date Aug. 9, 2013, 12 pages.

Office Action for U.S. Appl. No. 12/700,557, mail date Feb. 4, 2013, 11 pages.

Office Action for U.S. Appl. No. 13/250,858 mail date Feb. 19, 2014, 13 page.

Office Action on U.S. Appl. No. 13/250,940 Dated Mar. 25, 2014, 12 pages.

Office Action on U.S. Appl. No. 13/251,087 Dated Mar. 28, 2014, 12 pages.

Cameron, A., The Application of Holograhpic Optical Waveguide Technology to Q-Sight Family of Helmet Mounted Displays, Proc. of SPIE, vol. 7326, 7326OH-1, 2009, 11 pages.

Office Action for U.S. Appl. No. 13/250,621, mail date May 21, 2013, 10 pages.

Office Action for U.S. Appl. No. 13/250,858, mail date Oct. 28, 2013, 9 pages.

Office Action for U.S. Appl. No. 13/250,940, mail date Aug. 28, 2013, 15 pages.

Office Action for U.S. Appl. No. 13/250,940, mail date Mar. 12, 2013, 11 pages.

Office Action for U.S. Appl. No. 13/250,970, mail date Jul. 30, 2013, 4 pages.

Office Action for U.S. Appl. No. 13/250,994, mail date Sep. 16, 2013, 11 pages.

Wisely, P.L., Head up and head mounted display performance improvements through advanced techniques in the manipulation of light, Proc. of SPIE vol. 7327, 732706-1, 2009, 10 pages.

Final Office Action on U.S. Appl. No. 13/250,858 Dated Feb. 4, 2015, 18 pages.

Non-Final Office Action on U.S. Appl. No. 14/038,400 Dated Feb. 5, 2015, 18 pages.

Office Action on U.S. Appl. No. 13/892,026 Dated Dec. 8, 2014, 19 pages.

Final Office Action on U.S. Appl. No. 13/250,940 Dated Oct. 17, 2014, 15 pages.

Irie, Masahiro, Photochromic diarylethenes for photonic devices, Pure and Applied Chemistry, 1996, pp. 1367-1371, vol. 68, No. 7, IUPAC.

(56) References Cited

OTHER PUBLICATIONS

Non-Final Office Action on U.S. Appl. No. 13/864,991 Dated Oct. 22, 2014, 16 pages.
Plastic has replaced glass in photochromic lens, www.plastemart.com, 2003, 1 page.
Webster's Third New International Dictionary 433 (1986), 3 pages.
Amendment and Reply for U.S. Appl. No. 12/571,262, mail date Dec. 16, 2011, 7 pages.
Amitai, Y., et al. "Visor-display design based on planar holographic optics," Applied Optics, vol. 34, No. 8, Mar. 10, 1995, pp. 1352-1356.
Ayras, et al., "Exit pupil expander with a large field of view based on diffractive optics", Journal of the Society for Information Display, 17/8, 2009, pp. 659-664.
Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.
Crawford, "Switchable Bragg Gratings", Optics & Photonics News, Apr. 2003, pp. 54-59.
Extended European Search Report for EP Application No. 13192383, dated Apr. 2, 2014, 7 pages.
Final Office Action in U.S. Appl. No. 13/864,991, dated Apr. 2, 2015, 16 pages.
Final Office Action on U.S. Appl. No. 13/892,026 Dated Apr. 3, 2015, 17 pages.
International Preliminary Report on Patentability for PCT Application No. PCT/US2013/038070, dated Oct. 28, 2014, 6 pages.
International Search Report and Written Opinion regarding PCT/US2013/038070, mail date Aug. 14, 2013, 14 pages.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/250,858 Dated Jun. 12, 2015, 20 pages.
Non-Final Office Action on U.S. Appl. No. 13/250,940 Dated Mar. 18, 2015, 17 pages.
Non-Final Office Action on U.S. Appl. No. 13/432,662 Dated May 27, 2015, 15 pages.
Non-Final Office Action on U.S. Appl. No. 13/844,456 Apr. 1, 2015, XX Pages.
Non-Final Office Action on U.S. Appl. No. 13/869,866 Dated May 28, 2014, 16 pages.
Non-Final Office Action on U.S. Appl. No. 14/044,676 Dated Apr. 9, 2015, 13 pages.
Non-Final Office Action on U.S. Appl. No. 14/225,062 Dated May 21, 2015, 11 pages.
Nordin, G., et al., Journal of the Optical Society of America A., vol. 9, No. 12, Dec. 1992, pp. 2206-2217, 12 pages.
Office Action for U.S. Appl. No. 12/571,262, mail date Sep. 28, 2011, 5 pages.
Office Action for U.S. Appl. No. 13/355,360, mail date Sep. 12, 2013, 7 pages.
Press Release, "USAF Awards SBG Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internat at http://www.digilens.com/pr10-2012.2.php. 2 pages.
Requirement for Restriction/Election on U.S. Appl. No. 13/844,456 Dated Sep. 12, 2014, 23 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Final Office Action on U.S. Appl. No. 13/869,866 Dated Oct. 3, 2014, 17 pages.
Final Office Action on U.S. Appl. No. 14/038,400 Dated Aug. 10, 2015, 32 pages.
First office action received in Chinese patent application No. 201380001530.1, dated Jun. 30, 2015, 9 pages with English translation.
Non-Final Office Action on U.S. Appl. No. 13/869,866 Dated Jul. 22, 2015, 28 pages.
Non-Final Office Action on U.S. Appl. No. 13/892,026 Dates Aug. 6, 2015, 22 pages.
Non-Final Office Action on U.S. Appl. No. 14/109,551 Dated Jul. 14, 2015, 32 pages.
Non-Final Office Action on U.S. Appl. No. 14/168,173 Dated Jun. 22, 2015, 14 pages.
Notice of Allowance on U.S. Appl. No. 13/355,360 Dated Apr. 10, 2014, 7 pages.
Office Action, U.S. Appl. No. 10/696,507, mailed on Nov. 13, 2008, 15 pages.
Non-Final Office Action on U.S. Appl. No. 14/152,756, mail date Aug. 25, 2015, 39 pages.
Non-Final Office Action on U.S. Appl. No. 13/250,858, dated Mar. 18, 2016, 20 pages.
Non-Final Office Action on U.S. Appl. No. 13/844,456, dated Jan. 15, 2016, 16 Pages.
Non-Final Office Action on U.S. Appl. No. 13/864,991 dated Nov. 30, 2015, 18 pages.
Non-Final Office Action on U.S. Appl. No. 14/044,676, dated Jan. 20, 2016, 21 pages.
Non-Final Office Action on U.S. Appl. No. 14/260,943 dated Feb. 3, 2016, 19 pages.
Notice of Allowance on U.S. Appl. No. 13/432,662, dated Feb. 18, 2016, 10 pages.
U.S. Appl. No. 14/814,020, filed Jul. 30, 2015, Brown et al.
Extended European Search Report for European Application No. 13765610.4 dated Feb. 16, 2016, 6 pages.
Final Office Action on U.S. Appl. No. 13/250,858, dated Jul. 11, 2016, 21 pages.
Final Office Action on U.S. Appl. No. 13/864,991, dated Jun. 27, 2016, 16 pages.
Final Office Action on U.S. Appl. No. 14/168,173, dated Nov. 4, 2015, 10 pages.
Final Office Action on U.S. Appl. No. 14/260,943, dated Jul. 19, 2016, 23 pages.
Non-Final Office Action on U.S. Appl. No. 14/152,756, dated Apr. 26, 2016, 17 pages.
Non-Final Office Action on U.S. Appl. No. 14/168,173 dated Mar. 10, 2016, 9 pages.
Notice of Allowance on U.S. Appl. No. 13/892,026, dated Jul. 18, 2016, 10 pages.
Notice of Allowance on U.S. Appl. No. 14/814,020, dated Aug. 12, 2016, 15 pages.
Non-Final Office Action on U.S. Appl. No. 13/892,026 dated Mar. 22, 2016, 16 pages.

\* cited by examiner

WAVEGUIDE COMBINER SYSTEM AND METHOD WITH LESS SUSCEPTIBILITY TO GLARE

CROSS REFERENCE TO RELATED APPLICATIONS

The present application is related to: U.S. patent application Ser. No. 13/892,026, filed on an even date herewith, by Stratton et al., U.S. patent application Ser. No. 13/250,940, filed on Sep. 30, 2011 by Stahl et al., U.S. patent application Ser. No. 13/251,087, filed on Sep. 30, 2011 by Brown et al.; U.S. patent application Ser. No. 13/250,858, filed on Sep. 30, 2011 by Brown et al., U.S. patent application Ser. No. 13/250,970, filed on Sep. 30, 2011 by Burns et al., U.S. patent application Ser. No. 13/250,994, filed on Sep. 30, 2011 by Wood et al., and U.S. patent application Ser. No. 13/250,621, filed on Sep. 30, 2011 by Brown et al., incorporated herein by reference herein in their entireties and assigned to the assignee of the present application.

BACKGROUND OF THE INVENTION

The present specification relates to displays. More particularly, the present specification relates to head up displays (HUDs).

Conventional HUDs are generally large, expensive and difficult to fit into small airplanes. Often, conventional HUDs rely on large lenses to form adequate field of view and viewing eye box. Compact HUDs are needed for tactical jets and other small aircraft where space is constrained in the cockpit. Substrate guided or waveguide HUDs have been proposed which use waveguide combiners to preserve eye box size while reducing lens size. U.S. Pat. No. 4,309,070 issued to St. Leger Searle and U.S. Pat. No. 4,711,512 issued to Upatnieks disclose substrate waveguide HUDS where the pupil of a collimating optical system is effectively expanded by the waveguide structure.

Modern cockpits are incorporating large area head down displays (LADs or LAHDDs). The LADs can provide panoramic views and large areas to the display information below the glare shield of the aircraft. However, such LADs do not provide HUD capabilities and require space in the cockpit that is required by conventional HUDs. HUDs which use waveguide combiners have a smaller size but can be susceptible to glare or sunspot imaging. The susceptibility is increased in glass cockpit environments, such as, those associated with tactical aircraft.

Accordingly, there is also a need for a HUD that is less susceptible to glare and/or sunspot imaging. There is also a need for a low profile HUD which is compatible with LADs and has acceptable display performance in environments subject to sunlight or other light. There is a need for a HUD that can fit within the cockpit of a tactical aircraft or other small aircraft when an LAD is provided in the aircraft and has glare mitigation. Further, there is a need for a compact HUD for use with an LAD. Further still, there is a need for a HUD having a waveguide combiner that is less susceptible to solar glare and sunspot imaging.

SUMMARY OF THE INVENTION

An exemplary embodiment relates to a head up display (HUD) for providing light from an image source in a cockpit environment. The head up display includes a waveguide disposed at an angle with respect to a top surface of a glare shield having a first coupler at a first end and a second coupler at a second end. The waveguide is positioned as a combiner and allows viewing of an outside scene and information from the image source. The waveguide includes a diffuser disposed between a surface of the waveguide and a windshield of the cockpit or between the surface of the waveguide and a ceiling of the cockpit.

Another exemplary embodiment relates to a method of providing information to a pilot. The method includes providing light associated with the information from within a glare shield to an input coupler of a substrate waveguide, and providing the light associated with the information at the input coupler of the substrate waveguide into the substrate waveguide by diffraction and diffracting the light associated with the information out of the substrate waveguide at an output coupler of the waveguide for reception by the pilot above the glare shield. The method also includes diffusing or blocking sunlight before the sunlight strikes on a surface of the substrate waveguide at a location associated with the output coupler.

Another embodiment relates to a head up display including a waveguide combiner and a glare mitigator. The waveguide combiner includes an input grating and an output grating. The glare mitigator is disposed to prevent glare through the output grating from reaching an eye box.

BRIEF DESCRIPTION OF THE DRAWINGS

Exemplary embodiments are hereafter described with reference to the accompanying drawings, wherein like numerals denote like elements; and.

DETAILED DESCRIPTION OF THE PREFERRED EMBODIMENTS

Figure 1:
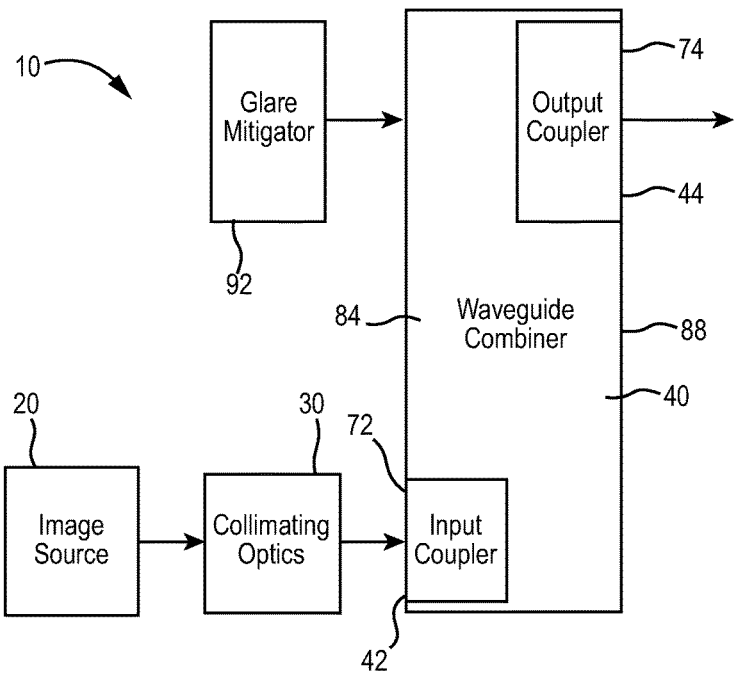
FIG. 1 is a general schematic block diagram of a head up display (HUD) system including a substrate waveguide with an input and output coupler and a glare mitigator in accordance with an exemplary embodiment.

Before describing in detail the particular improved system and method, it should be observed that the invention includes, but is not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, a head up display (HUD) system 10 can be utilized in various applications, including but not limited to aviation, medical, naval, targeting, ground based, military, etc. HUD system 10 is preferably configured for use in smaller cockpit environments and yet provides an appropriate field of view and eye box for avionic applications. In one embodiment, HUD system 10 is configured for use in a tactical cockpit and is compatible with large area head down displays (LADs).

HUD system 10 includes an image source 20 and a substrate waveguide combiner 40 in one embodiment. Image source 20 can be any device for providing an image including but not limited to a CRT display, an LED display, an active matrix liquid crystal display (LCD), a light emitting diode, laser illuminator, etc. In a preferred embodiment, image source 20 is a micro LCD assembly or liquid crystal on silicon (LCOS) display and can provide linearly polarized light. Image source 20 can include a laser or LED backlight.

In addition, system 10 can include collimating optics 30 disposed between substrate waveguide combiner 40 and image source 20. Collimating optics 30 can be a single optical component, such as a lens, or include multiple optical components. In one embodiment, collimating optics 30 are configured as a catadioptric collimator. Collimating optics 30 can be any optical component or configuration of optical components that provide light (preferably collimated light) from image source 20 to substrate waveguide combiner 40. Collimating optics 30 can be integrated with or spaced apart from image source 20 and/or substrate waveguide combiner 40.

In operation, system 10 provides images from image source 20 to a pilot or other operator so that the pilot can simultaneously view the images and a real world scene. The images can include graphic and/or text information (e.g., flight path vector, target icons, etc.) related to avionic information in one embodiment. In addition, the images can include synthetic or enhanced vision images. In one embodiment, collimated light representing the image from image source 20 is provided on substrate waveguide combiner 40 so that the pilot can view the image conformally on the real world scene through substrate waveguide combiner 40. In one embodiment, waveguide combiner 40 is preferably transparent for viewing the real world scene through main surfaces or sides 84 and 88. In one embodiment, waveguide combiner 40 can be bent as discussed below with reference to FIG. 5.

In one preferred embodiment, HUD system 10 is configured to provide uniform luminance and expand the pupil of system 10 in one or more axes (e.g., along a vertical axis). Waveguide combiner 40 can effect single axis pupil expansion using an input coupler 42 at an input 72 and an output coupler 44 at an output 74 that is configured to provide uniform luminance. The single axis expansion can be on the order of 2 to 7 times (e.g., approximately 4 times in one preferred embodiment). Other orders of pupil expansion are possible depending upon performance criteria, design parameters, and optical components utilized without departing from the scope of the invention.

Couplers 42 and 44 can be gradient coupling gratings that provide excellent image quality and acceptable brightness in a preferred embodiment. Couplers 42 and 44 are implemented as any type of diffractive element (e.g., dichromated gratings, holographic or blazed surface relief gratings) in one embodiment. Couplers 42 and 44 can be implemented according to a number of techniques including but not limited to mechanical reproduction, holographic formation, embossing, casting (e.g., into a polymer resin), or lithography.

Substrate waveguide combiner 40 can be a single glass plate or can be made from two or more fixed glass plates. Substrate waveguide combiner 40 can have a variety of shapes including generally rectangular, oval, circular, tear drop-shaped, hexagonal, rectangular with rounded corners, square-shaped, etc.

In operation, substrate waveguide combiner 40 advantageously receives light from image source 20 provided through collimating optics 30 at an input 72 and provides light to a user at its output 74. Image source 20 provides information using a single color of light (e.g., green light approximately between 500 and 550 nanometers (nm)). Light provided to substrate waveguide 40 is preferably linearly S-polarized or P-polarized and collimated. Alternatively, other polarization, multiple colors, or other colors at different wavelengths can be utilized without departing from the scope of the invention. Optics 30 can have an output disposed directly adjacent or attached to coupler 42.

Substrate waveguide combiner 40 preferably performs two operations in one preferred embodiment. First, substrate waveguide 40 is disposed to provide a medium for transporting light by total internal reflection from input 72 to output 74. Light is reflected multiple times off of opposing main sides 84 and 88 of substrate 40 as it travels from input 72 to output 74. Second, substrate waveguide combiner 40 operates as a combiner allowing the user to view the light from image source 20 at output 74 and light from the real world scene through sides 84 and 88.

Light from collimating optics 30 first strikes coupler 42 at input 72 on side 84 of substrate waveguide combiner 40. Coupler 42 diffracts light toward the length of combiner 40 so that it travels by total internal reflection to output 74 on side 84. At output 74, coupler 44 diffracts the light toward the user and out of the substrate waveguide combiner 40. Coupler 42 at input 72 preferably has a greater efficiency than coupler 44 at output 74 in one embodiment.

Couplers 42 and 44 are disposed on respective opposing sides 84 and 88 of substrate waveguide 40 in one embodiment. Couplers 42 and 44 can also be formed on the same side 84 of or within waveguide combiner 40 in one alternative embodiment. Couplers 42 and 44 can be disposed respectively on sides 88 and 84 of waveguide combiner 40, within waveguide combiner 40 or both on the same side 88 of waveguide combiner 40 in other alternative embodiments.

Couplers 42 and 44 are preferably disposed in respective areas that are rectangular in shape and have the same width as each other in one embodiment. Alternatively, couplers 42 and 44 can have different widths. Coupler 44 has a greater height than coupler 42 in one embodiment.

According to one embodiment, system 10 advantageously includes a glare mitigator 92. Glare mitigator 92 can be a device for blocking, diffusing or dimming light from the environment and preventing such light from affecting the view of the pilot through waveguide combiner 40. For example, glare mitigator 92 can reduce susceptibility to overhead sunlight conditions which can cause solar glare and sunspot imaging via diffraction through output grating 74. In one embodiment, glare mitigator 92 is a passive glare mitigation element or layer. Alternatively, mitigator 92 can be an active mitigation element.

In one embodiment glare mitigator 92 is a directional diffuser that diffuses the sunlight so that diffracted light is significantly less bright or non-existent to the pilot's eyes. The sunlight rays are diffused and scattered so that they encounter output diffraction grating 74 at incident angles that either (1) diffract away from the eye motion box or (2) diffract into the eye motion box with significantly lower intensity. Alternatively, a shading mechanism or a dimming mechanism can provide glare mitigation. System parameters and design criteria can affect the placement of mitigator 92.

Figure 2:
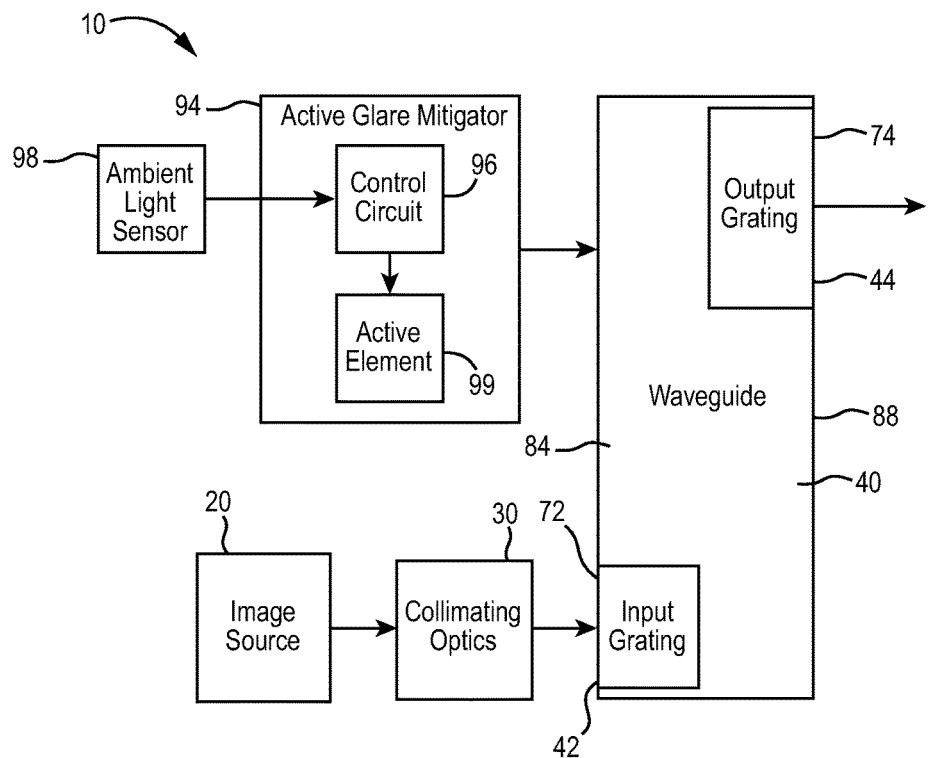
FIG. 2 is a general schematic block diagram of a head up display system including a substrate waveguide with an input and output coupler and an active glare mitigator in accordance with another exemplary embodiment.

With reference to FIG. 2, HUD system 10 can be utilized with an active glare mitigator 94. Active glare mitigator 94 includes a control circuit 96, an ambient sensor 98 and an active element 99. Mitigator 94 can sense the sunlight or other interfering light within the cockpit via ambient sensor 98 and respond to levels of the light to shade, dim, block or diffuse the sunlight via active element 99. Active element 99 can be a diffusing layer that can actively respond to a signal from control circuit 96 to provide more diffusion when ambient sunlight can provide conditions associated with solar glare and sunspot imaging in one embodiment. Alternatively, active element 99 can be a selectable dimmer or a selectable shading device. In one embodiment, attenuation of sunlight can allow the backlight to be dimmed. Conservation of backlight power and a contrast ratio of 1.2 to 1 can be achieved with lower luminance provided by the real world in one embodiment.

Ambient sensor 98 can utilize an existing ambient sensor for system 10. A second prismatic path can be used to provide light to the existing ambient sensor. The existing sensor or sensors 93 can characterize sunlight exposure conditions in the environment of HUD system 10. Active element 99 can utilize various controlled glare mitigation elements, (e.g., electronic dimmers, optical or mechanical gratings, a diffusive layer electronically controlled shades, etc.) to prevent solar exposure at critical angles.

Active glare mitigator 94 and glare mitigator 92 can use one or more of a shading, dimming, blocking or diffusing operation. For example, combinations of shading, dimming, blocking and diffusion can be utilized. System parameters and application criteria including angle of waveguide 400, characteristics of diffraction of output grating 74, etc., can affect the placement and characteristics of active element 99 and mitigator 92.

Advantageously, mitigators 92 and/or 94 diffuse the light before it strikes or enters grating 74 in the total field of view (TFOV) in one embodiment. For example, system 10 can advantageously use a diffuser that is diffused light in one direction of incidence and is transparent in another range incident angles (e.g., the TFOV as seen by the pilot.) Accordingly, the diffuser diffuses the light so that an unobstructed path from the sun to waveguide combiner 40 does not allow the sunlight to diffract towards the pilot. Advantageously, HUD system 10 in FIGS. 1 and 2 provides the advantages of decreased sunspot brightness and reduced glare while being transparent in the total field of view as seen from the pilot.

Figure 3:
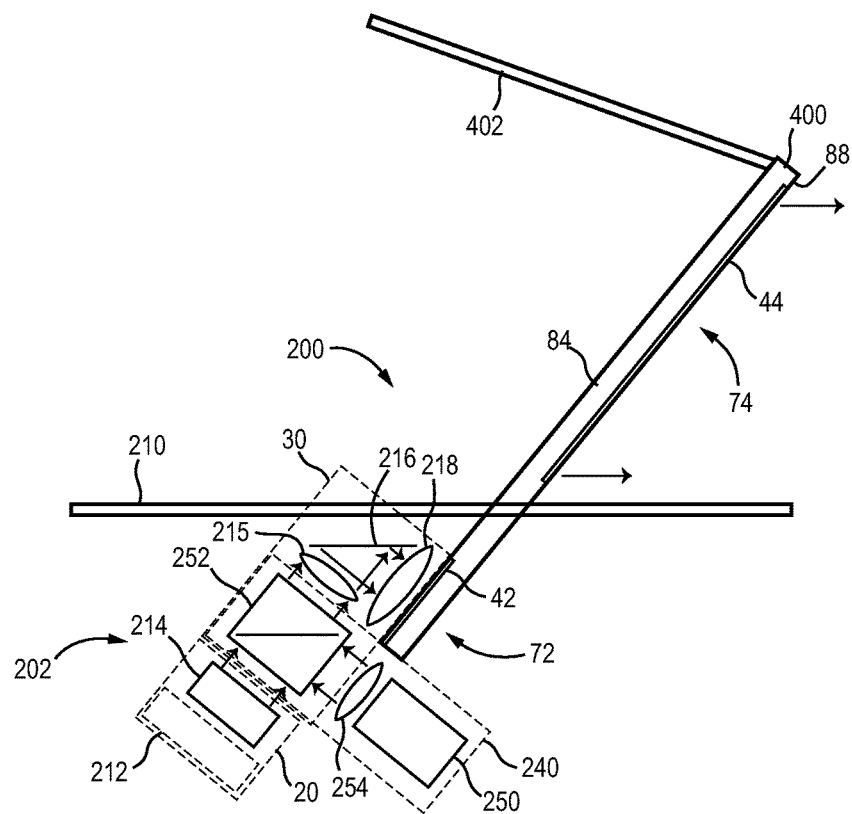
FIG. 3 is a side view schematic drawing of an embodiment of the HUD systems illustrated in FIGS. 1 and 2 in accordance with yet another exemplary embodiment.

With reference to FIG. 3, a HUD system 200 that is an embodiment of HUD system 10 is comprised of a projector 202 and a waveguide combiner 400 similar to waveguide 40. Projector 202 is provided beneath a top surface glare shield 210 in one embodiment. Substrate waveguide combiner 400 can be disposed through a glare shield 210 such that the input end of substrate waveguide 400 is beneath glare shield.

Projector 202 can include image source 20 and collimating optics 30. Image source 20 can include a backlight 212 which can be an LED backlight in one embodiment. Image source 20 can also include display 214 which can be an active matrix LCD, although other types of image sources 20 are available according to alternative embodiments.

In one embodiment, projector 202 is an LCOS based system including a beam splitter 252, an LED or laser illuminator 250, and an LCOS display in the position of display 214. An image shaping lens 254 is provided between illuminator 250 and beam splitter 252. Beam splitter 252 reflects polarized (e.g., s-polarized) light and provides the light to display 214 which selectively rotates the polarization to p-polarized light in one embodiment. The p-polarized light is provided through beam splitter 252 and collimating optics 30.

Collimating optics 30 includes a lens 215, a mirror 216 and a lens 218 in one embodiment. Lens 215, mirror 216 and lens 218 are configured to provide collimated light to coupler 42. Optics 30 can be embodied in various forms including more or fewer components.

Light from collimating optics 30 advantageously enters waveguide 400 beneath glare shield 210 at input coupler 42. Light is provided through waveguide combiner 400 in a manner similar to waveguide combiner 40 discussed above to output coupler 44 for viewing by the pilot. Preferably, output coupler 44 is entirely disposed above a top surface of glare shield 210. Projector 202 and combiner 400 partially beneath the surface of glare shield 210 provides a compact space saving design that does not interfere with space for LAD. Although specific components are discussed for projector 202, various optical components can be utilized. The collimating optics 30 shown in FIG. 3 are not shown in a limiting fashion. Other collimating systems can be utilized.

HUD system 200 can utilize a diffuser 402 that is disposed substantially parallel to the line of sight of the pilot as seen from the design location such that obscuration is minimized in one embodiment. Diffuser 402 can be at an angle with respect to glare shield 210 according to certain embodiments. Alternatively, diffuser 402 can be a shade rather than a diffuser. The shade can be louvered element. In another embodiment, diffuser 402 can be a transparent layer with an active or passive electrochromic layer. Generally, element 402 can be held by rails attached to combiner 400. The material for element 402 can be a diffusing material or be opaque in one embodiment. Advantageously, the shade or diffuser 402 is relatively thin thereby providing reduced obstruction to the pilot's view. In one embodiment, the diffuser is translucent. Diffuser 402 can be the active element 91 discussed with reference to FIG. 2. In one embodiment, a diffuser 402 is located between combiner 400 and a ceiling or cockpit or between windshield or the cockpit and combiner 400. to provide glare mitigation.

Figure 4:
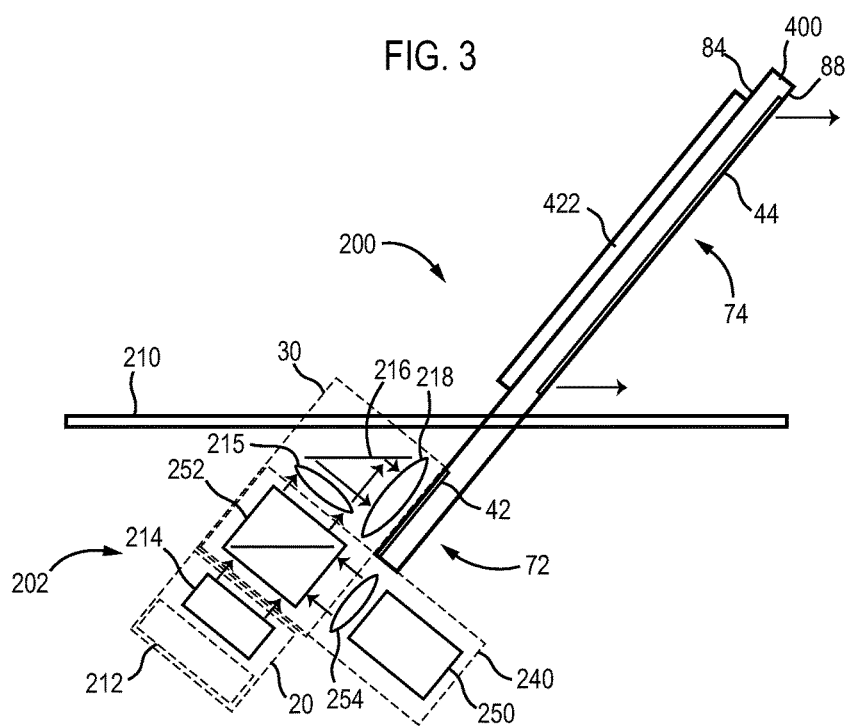
FIG. 4 is a side view schematic drawing of another embodiment of the HUD systems illustrated in FIGS. 1 and 2 in accordance with still another exemplary embodiment.

With reference to FIG. 4, HUD system 200 includes a layer 422 provided on waveguide 400. In one embodiment, layer 422 is a diffusive layer. Layer 422 can be made spaced apart from surface 84. In one embodiment, layer 422 can be physically separated and parallel to surface 84. In one embodiment, layer 422 is disposed between combiner 400 and the ceiling or windshield of the cockpit.

Figure 5:
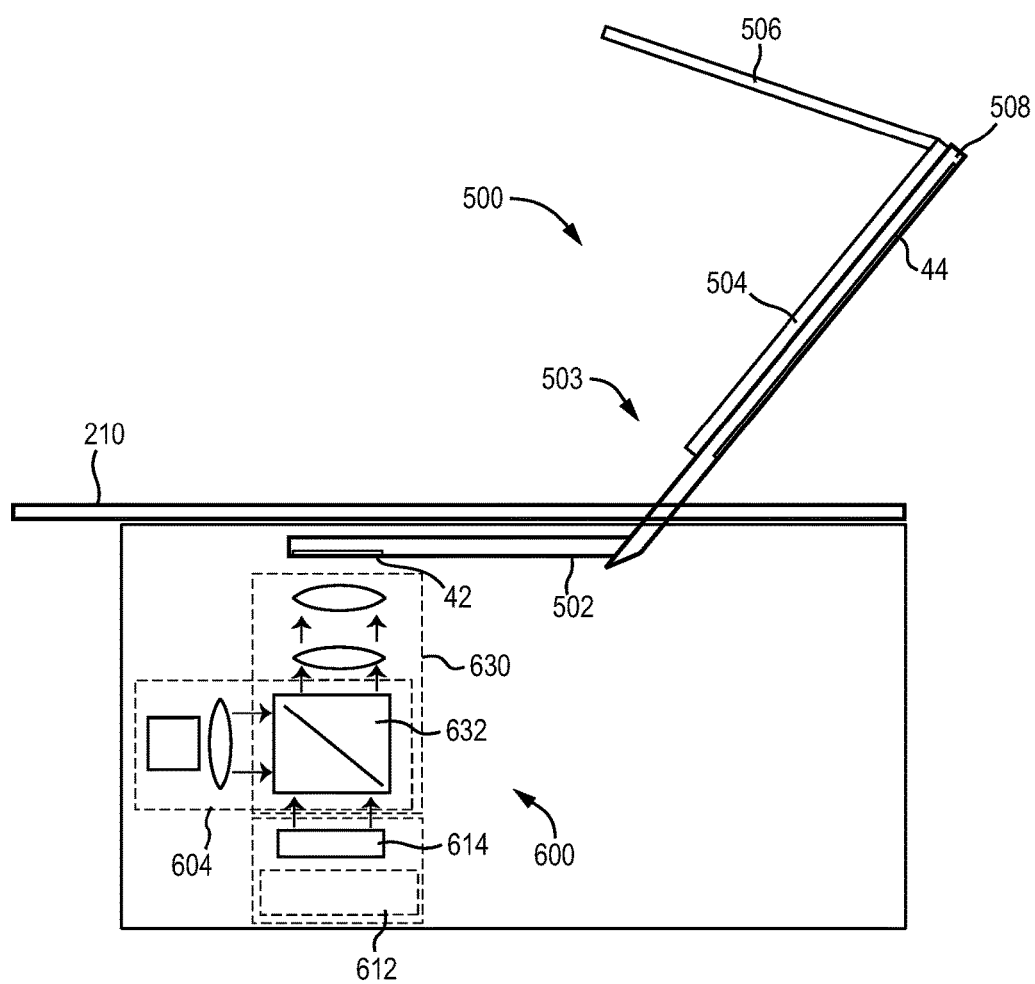
FIG. 5 is side view schematic drawing of yet another embodiment of the HUD systems illustrated in FIGS. 1 and 2 in accordance with another exemplary embodiment.

With reference to FIG. 5, a HUD system 500 can have a bent waveguide combiner configuration. A projector 600 for HUD 500 system includes a laser or LED illuminator 604, a backlight 612, an image source 614, a beam splitter 632, and collimating lens 630. A combiner system 503 includes a horizontal waveguide 502 and angled waveguide 508.

Waveguide 508 can include a glare mitigation layer 504 or a glare mitigation element 506 similar to element 402 and layer 422 discussed above with reference to FIGS. 3 and 4.

In one embodiment, layer 504 or element 506 is located between the ceiling or windshield of the cockpit.

Element 506 can be an opaque shade or be a controlled mechanical or electrical dimming element. Element 506 can be a louvered system that is electronically or manually controlled in one embodiment. Layer 504 can be a diffusing layer in one embodiment.

Figure 6:
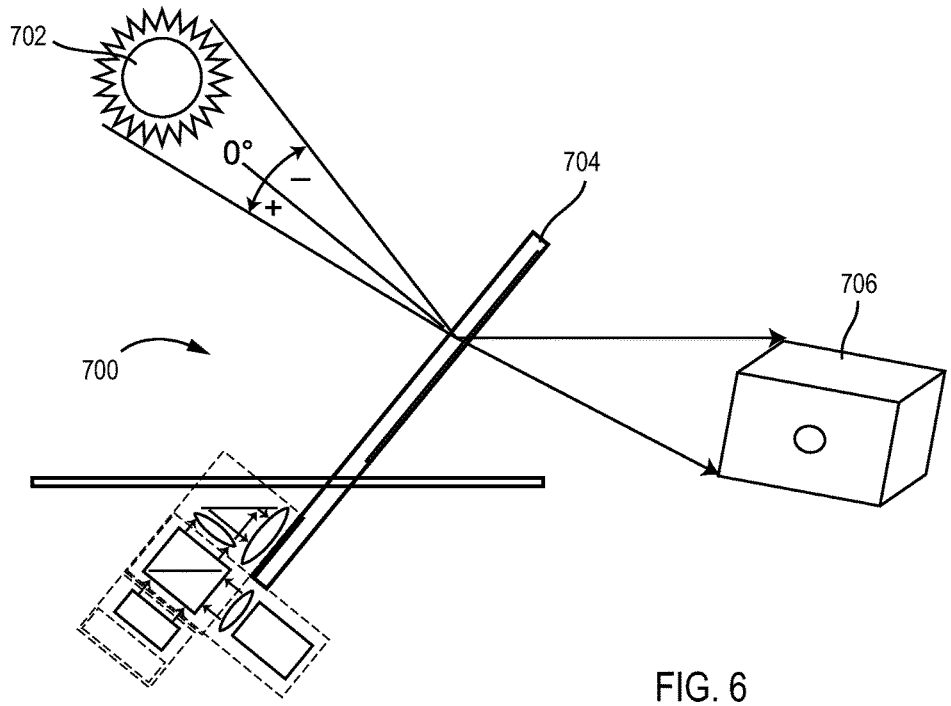
FIG. 6 is a side view schematic drawing of a HUD system exposed to sunlight without glare mitigation.

With reference to FIG. 6, light from sun 702 interacts with HUD system 700 and can strike waveguide 704 and be diffracted into the eye motion box 706 of the pilot. For example, light can be diffracted into the eye motion box 706 of the pilot if it enters waveguide 704 at an angle supported by the grating equation given the grating spatial period, index of output coupler 44 and the wavelength of light.

Figure 7:
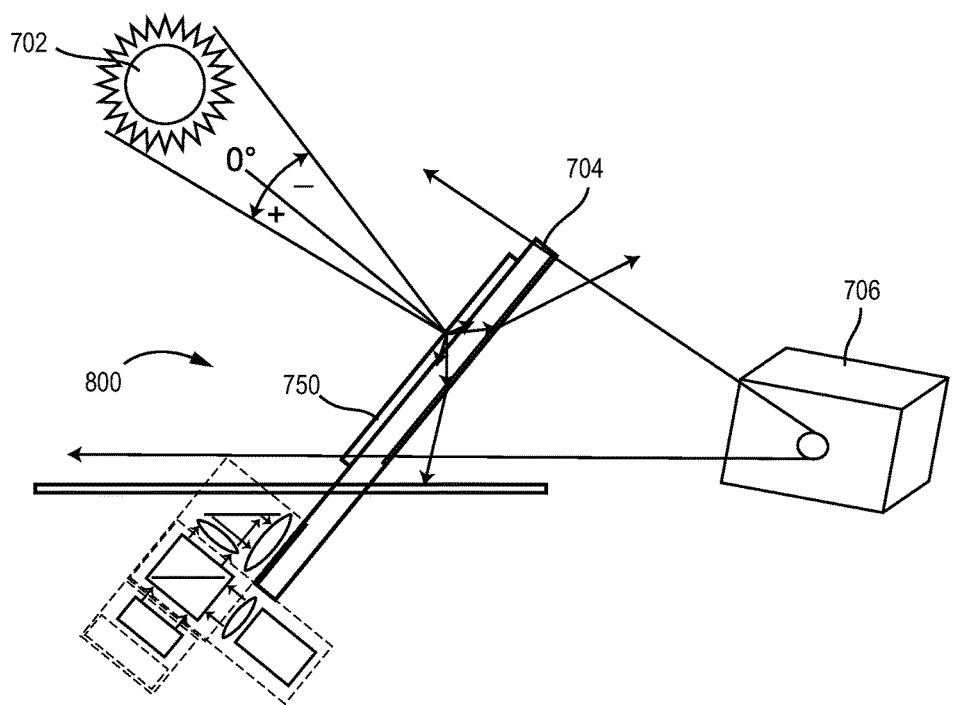
FIG. 7 is a side view schematic drawing of an exemplary embodiment of the HUD systems illustrated in FIGS. 1 and 2 exposed to sunlight with glare mitigation.

With reference to FIG. 7, a glare mitigator 750 can be utilized to prevent light from sun 702 from reaching eye motion box 706. In one embodiment, element 750 is a layer which diffuses light so that it is not diffracted into waveguide 704 at angles where it will reach eye motion box 706 of the pilot. The angles shown in FIGS. 6 and 7 are exemplary only and are related to the angle of the combiner, characteristics of diffraction of output coupler 44, etc. The angles can be +13 to −30 or +15-25 degrees in certain specific embodiments, Various factors can affect the appropriate placement and characteristics of element 99 and mitigator 92 without departing from the scope of the invention.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Various changes may be made to the details disclosed without departing from the spirit of the invention which is defined by the following claims.

What is claimed is:

1. A head up display for use in a cockpit and for providing light from an image source, the head up display comprising:
    a waveguide comprising a first waveguide portion physically coupled with a second waveguide portion, the first waveguide portion having a first end and disposed under and parallel to a top surface of a glare shield, the second waveguide portion having a second end and disposed at an angle with respect to the top surface of the glare shield, the waveguide having a first coupler at the first end and a second coupler at the second end, the waveguide positioned as a combiner and allowing viewing of an outside scene and information from the image source, the waveguide configured to cause light associated with the information to travel by total internal reflection from the first end to the second end, the waveguide having a glare reducer attached to the second waveguide portion and disposed between a surface of the waveguide and a windshield of the cockpit or between the surface of the waveguide and a ceiling of the cockpit, wherein the glare reducer is a directional diffuser configured to diffuse ambient light that enters the cockpit through the windshield before the ambient light enters the waveguide so that the ambient light enters the waveguide and travels through the waveguide towards the second coupler at an incident angle that causes the ambient light to diffract away from an eye motion box of a pilot upon exiting the waveguide, thereby reducing sunspot imaging via diffraction through the second coupler.

2. The head up display of claim 1, wherein the glare reducer is a diffuser spaced apart from the surface of the waveguide.

3. The head up display of claim 2, wherein the diffuser is attached to a top end of the waveguide and extends approximately parallel to the line of sight from a pilot towards a front of the cockpit.

4. The head up display of claim 1, wherein the first and second couplers are diffractive elements.

5. The head up display of claim 1, wherein the second coupler is disposed entirely above the top surface.

6. The head up display of claim 1, wherein the waveguide has substantially the same width as an exit pupil of collimating optics.

7. The head up display of claim 1, wherein light from the image source enters and leaves the waveguide on a same side.

8. The head up display of claim 1, wherein light from the image source enters and leaves on opposing sides.

9. The head up display of claim 1, further comprising a lens disposed between the waveguide and the image source.

10. The head up display of claim 1, wherein the first coupler has a greater efficiency than the second coupler.

11. A head up display, comprising:
    a waveguide combiner including a first waveguide portion physically coupled with a second waveguide portion, the first waveguide portion having an input grating and disposed under and parallel to a top surface of a glare shield, the second waveguide portion having an output grating and disposed at an angle with respect to the top surface of the glare shield, wherein light travels from the input grating to the output grating by total internal reflection; and
    a glare mitigator disposed to prevent glare through the output grating from reaching an eye box, the glare mitigator configured to diffuse ambient light before the ambient light enters the waveguide combiner so that the ambient light enters the waveguide combiner and travels through the waveguide combiner towards the output grating at an incident angle that causes the ambient light to diffract away from an eye motion box of a pilot upon exiting the waveguide combiner, thereby reducing sunspot imaging via diffraction through the output grating.

12. The head up display of claim 11, wherein the glare mitigator is a diffusive layer disposed above the output grating.

13. The head up display of claim 11, wherein the glare mitigator is a shade or a diffuser disposed above a glare shield and not parallel to the waveguide combiner.

14. The head up display of claim 11, wherein the glare mitigator includes an ambient sensor and an active element for diffusing sunlight in response to the ambient sensor.

* * * * *